(12) United States Patent
Campos et al.

(10) Patent No.: US 11,089,488 B2
(45) Date of Patent: Aug. 10, 2021

(54) EFFICIENT ADAPTABLE WIRELESS NETWORK SYSTEM WITH AGILE BEAMFORMING

(71) Applicant: CABLE TELEVISION LABORATORIES, INC., Louisville, CO (US)

(72) Inventors: Luis Alberto Campos, Superior, CO (US); Jennifer Andreoli-Fang, Boulder, CO (US); Thomas Williams, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/815,285

(22) Filed: Mar. 11, 2020

(65) Prior Publication Data

US 2020/0213872 A1    Jul. 2, 2020

Related U.S. Application Data

(60) Division of application No. 15/943,920, filed on Apr. 3, 2018, now Pat. No. 10,602,375, which is a continuation of application No. 14/816,434, filed on Aug. 3, 2015, now Pat. No. 9,936,397, which is a continuation of application No. 13/922,595, filed on Jun. 20, 2013, now Pat. No. 9,100,840.

(60) Provisional application No. 61/662,454, filed on Jun. 21, 2012.

(51) Int. Cl.
*H04W 16/28* (2009.01)
*H04W 64/00* (2009.01)
*H04W 88/08* (2009.01)
*H04W 84/04* (2009.01)

(52) U.S. Cl.
CPC .......... *H04W 16/28* (2013.01); *H04W 64/00* (2013.01); *H04W 84/042* (2013.01); *H04W 88/08* (2013.01)

(58) Field of Classification Search
CPC ... H04W 16/28; H04W 64/00; H04W 84/042; H04W 88/08
See application file for complete search history.

(56) References Cited

U.S. PATENT DOCUMENTS

| | | |
|---|---|---|
| 6,240,290 B1 | 5/2001 | Willingham et al. |
| 6,259,918 B1 | 7/2001 | Labonte et al. |
| 6,321,066 B1 | 11/2001 | Katz et al. |
| 6,349,217 B1 | 2/2002 | Honcharenko et al. |
| 6,553,012 B1 | 4/2003 | Katz |
| 9,380,582 B2 | 6/2016 | Li et al. |

(Continued)

FOREIGN PATENT DOCUMENTS

WO    2005120096 A3    4/2007

OTHER PUBLICATIONS

International Search Report and Written Opinion for corresponding PCT Application No. PCT/US2013/046734, dated Sep. 4, 2013, 12 pages.

*Primary Examiner* — Kenneth T Lam
(74) *Attorney, Agent, or Firm* — David Daniel Smith; Cable Television Laboratories, Inc.

(57) ABSTRACT

Beamforming for adapting wireless signaling beams in an adaptive and agile manner is contemplated. The beamforming may be characterized by adaptively constructing beam form parameters to provide wireless signaling in a manner that maximizes efficiency and bandwidth according to device positioning relative to a responding base station.

20 Claims, 7 Drawing Sheets

(56) References Cited

U.S. PATENT DOCUMENTS

| | | | |
|---|---|---|---|
| 2001/0003443 A1 | 6/2001 | Velazquez et al. | |
| 2001/0004604 A1 | 6/2001 | Toshimitsu et al. | |
| 2001/0044276 A1 | 11/2001 | Ihara et al. | |
| 2002/0039912 A1 | 4/2002 | Yamaguchi et al. | |
| 2002/0058535 A1 | 5/2002 | Lee | |
| 2003/0114195 A1* | 6/2003 | Chitrapu | H04W 36/32 455/562.1 |
| 2004/0259556 A1 | 12/2004 | Czys | |
| 2005/0213527 A1 | 9/2005 | Xie | |
| 2005/0272472 A1 | 12/2005 | Goldberg et al. | |
| 2008/0311844 A1 | 12/2008 | Eidenschink | |
| 2009/0051592 A1 | 2/2009 | Lee et al. | |
| 2010/0177725 A1 | 7/2010 | Rensburg | |
| 2011/0287796 A1 | 11/2011 | Jain et al. | |
| 2012/0155341 A1 | 6/2012 | Yamamoto et al. | |
| 2012/0157138 A1 | 6/2012 | Senda | |
| 2012/0220313 A1 | 8/2012 | Li et al. | |
| 2012/0320874 A1* | 12/2012 | Li | H04W 48/12 370/331 |
| 2013/0021952 A1* | 1/2013 | Jeong | H04W 72/046 370/277 |
| 2013/0217404 A1 | 8/2013 | Jung | |
| 2013/0286960 A1* | 10/2013 | Li | H04B 7/0684 370/329 |
| 2013/0308470 A1 | 11/2013 | Bevan et al. | |

* cited by examiner

EFFICIENT ADAPTABLE WIRELESS NETWORK SYSTEM WITH AGILE BEAMFORMING

CROSS-REFERENCE TO RELATED APPLICATIONS

This application is a divisional application of U.S. patent application Ser. No. 15/943,920, filed Apr. 3, 2018, which application is a continuation of U.S. patent application Ser. No. 14/816,434, filed Aug. 3, 2015, which is a continuation of U.S. patent application Ser. No. 13/922,595, filed Jun. 20, 2013, which claims the benefit of U.S. provisional application No. 61/662,454 filed Jun. 21, 2012, the disclosures of which are hereby incorporated in their entireties by reference herein.

TECHNICAL FIELD

The present invention relates to wireless network systems, such as but not necessary limited to adaptable wireless network systems having capabilities to facilitate beamforming.

BACKGROUND

In cellular and other wireless environments, one challenge is making the most efficient use of unused wireless spectrum. Wireless operators may acquire contiguous spectrum bands, such as in a range from 10 MHz to 30 MHz, where the spectrum may be divided among their customers. As signaling demands increase, such providers may resort to a strategy of decreasing the size of wireless cells in order to re-use the required spectrum, which tends to result in ever decreasing cell sizes as demand continues to increase. The cell sizes, for example, have shrunk in size from macro-cell, which could have a radius of 10 miles, to micro-cell to pico-cell and more recently to femto-cell with radii of 100 meters or less. While decreasing cell sizes may increase re-use of the acquired spectrum, the decreasing cell sizes also require additional cost to support and maintain the infrastructures (base stations) necessary to support the increased number of access points. In addition to the increased infrastructural costs of smaller wireless cells, an operator that has license to transmit over a spectrum of 30 MHz and has divided these spectral resources into 5 MHz sections to enable a frequency re-use strategy, may be limited to a peak rate of what can be achieve in 5 MHz, as opposed to that which could be achieved if more of the acquired spectrums was available for use. Accordingly, the present invention contemplates a system that may address issues with total capacity and/or peak capacity while limiting the need to acquire more cellular spectrum licenses and/or access points or base stations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
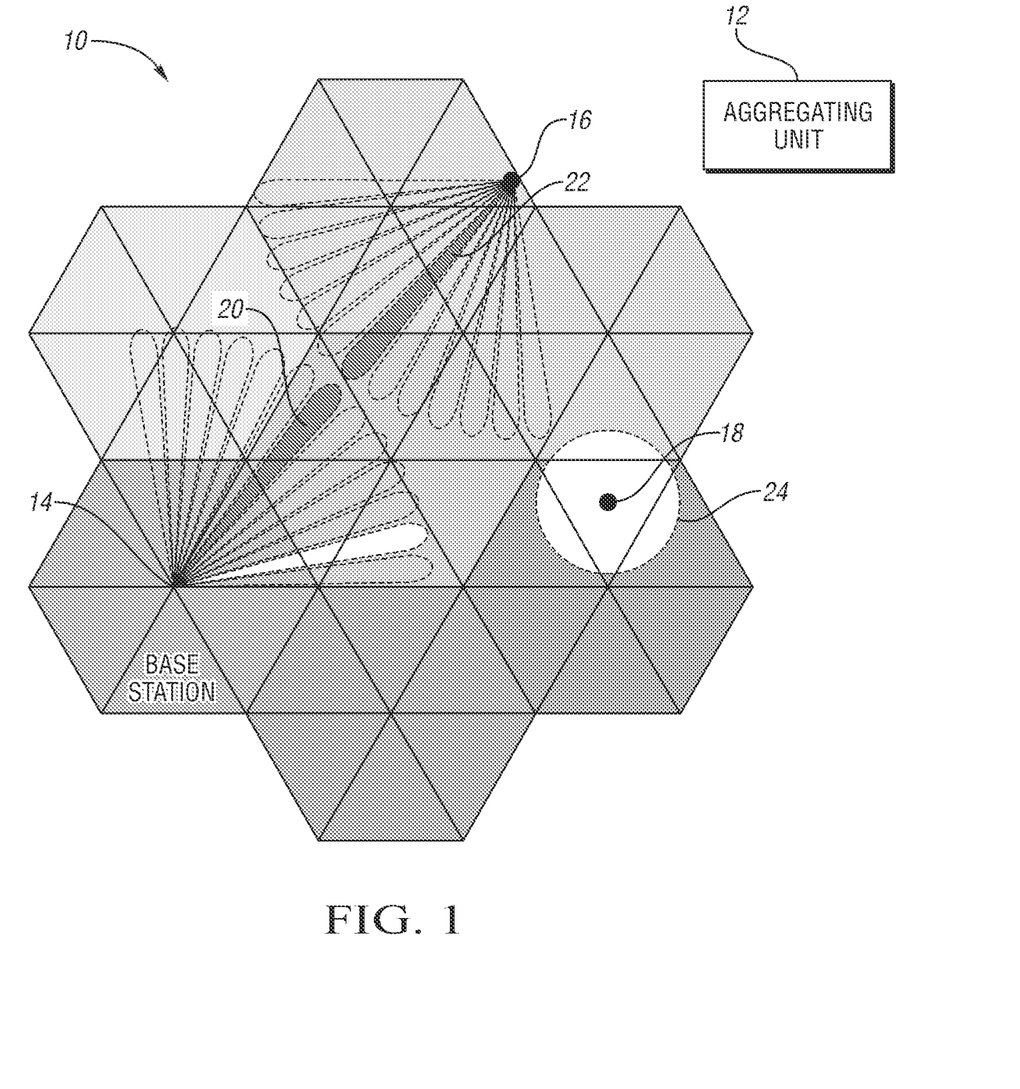
FIG. 1 illustrates a wireless networking system 0 in accordance with one non-limiting aspect of the present invention.

FIG. 1 illustrates a wireless networking system 10 in accordance with one non-limiting aspect of the present invention. The system 10 may operate in a manner similar to the system described in U.S. patent application Ser. No. 12/826,889, entitled Multi-Tier Polling, filed Jun. 30, 2010, the disclosure of which is hereby incorporated in its entirety by reference. The system may include an aggregating unit 12 operable with a plurality of base stations (center of hexagons) to facilitate any number of communication-based services for any number of wireless devices having capabilities sufficient to facilitate wireless signaling. A first base station 14 is shown relative to first and second wireless devices 16, 18. The aggregating unit 12 may be operable to schedule network resources as a function of information gleaned while polling each base station individually and adaptively, i.e., polling messages or other types of polling related transmissions may be individually communicated from the aggregating unit 12 to selective ones of the base stations at selective polling intervals in order to allocate network resources according to base station demands. One non-limiting aspect of the present contemplates relying on this adaptive polling capability to facilitate management of network space, including scheduling and controlling wireless signaling between the base stations and one or more devices.

The aggregating unit 12 may be any type of device operable to facilitate scheduling transmission between the base stations and the devices and/or the consumption of network resources associated with transporting data packets and other information from the bases stations through long-haul network resources. The present invention contemplates its use in many environments where it may be desirable to manage network space and wireless signaling through controlling wireless operations of the base stations and/or the devices. The aggregating unit 12, the base stations and/or devices may correspond with any type of electronic device and/or logically executing unit having capabilities sufficient to support communications with any type or combination of wireline and wireless networks, including but not limited to those associated with cable, satellite, or network television; cellular, wireless, or wireline phone systems; and wireless or wireline data transmissions. Optionally, the base stations may be configured to facilitate wireless and/or wireline signaling in accordance with the signal processor and/or converters described within U.S. patent application Ser. No. 13/769,288, entitled Multiple-Input Multiple-Output (MIMO) Communication System, the disclosure of which is hereby incorporated reference by its entirety.

The present invention is predominately described with respect to a cable television related configuration where the aggregating unit 12 may be a cable modem termination system (CMTS) associated with a wired, cable network provided to exchanging signaling with the base stations. The base stations may correspond with a cable modem, media terminal adaptor (MTA), settop box (STB), television, or other device desiring data communications over one or more of the networks to support cable related services, such as according to communications executed according to the Data Over Cable Service Interface Specification (DOCSIS). The bases stations may be wireless access points, such as cellular towers, having capabilities sufficient to convert wireless signaling exchange with the devices for long-haul transport. Of course, the present invention is not limited to cable related services or cable dependent communications and fully contemplates its application within non-cable environments. In particular, the present invention contemplates the aggregating unit being operable with the base stations to facilitate operating as wired or wireless access points having capabilities sufficient necessary to exchange signaling with the devices according to various protocols and signaling standards, including those associated with cellular cells, Wi-Fi, Zigbee, etc.

One non-limiting aspect of the present invention contemplates the base stations being configured to facilitate wireless signaling with the devices, such as wireless signaling employed when communicating with cellular enabled devices, Wi-Fi enabled devices or other wireless enabled devices. The base stations may be configured to exchange wireless signaling with the devices and to facilitate long-haul communication of the wireless signaling over a back-end infrastructure, which may be associated with a public network (Internet) or some other infrastructure to facilitate communication with other remotely located base stations or termination points, such as a cable and/or optical infrastructure. The base stations, for example, may be cellular towers or other devices having an antenna array or a plurality of antenna elements operable to facilitate beamforming where beam forms used to communicate with the devices may be selectively controlled and adapted in the manner contemplated by the present invention to facilitate maximizing network capacity and/or peak capacity while limiting the need to acquire more cellular spectrum licenses and/or access points or base stations. Optionally, some of the base stations may correspond with cellular towers and some of the base stations may correspond with Wi-Fi access points whereby the aggregating unit may be configured to facilitate scheduling and controlling operations of the disparate devices in order to facilitate the operations contemplated herein.

Each of the aggregating unit 12, the base stations and/or devices may include a memory, processor, I/O and/or other features necessary to implement the operations contemplated by the present invention. The memory may store code, non-transitory instructions or other computer readable information to be executed with a processor. The stored code may support a layered operating system or architecture to support decoupling of the MAC and PHY layers, such as in a manner described in U.S. patent application Ser. No. 12/827,496 entitled System and Method of Decoupling Media Access Control (MAC) and Physical (PHY) Operating Layers, filed Jun. 30, 2010, the disclosure of which is hereby incorporated by reference in its entirety. The aggregating unit 12, the base stations 14 and/or devices may operate according to architectures organized in compliance with the Operating System Interconnection (OSI) standard, DOCSIS, IEEE 802.11 standard for wireless local area networks (WLAN), IEEE 802.16 for wireless networks (WiMax), code/frequency/time division multiple access code (CDMA/FDMA/TDMA) standards for telephony communications and/or other layered based architectures and standards. Irrespective of the messaging standards or other protocol used to facilitate communications, one non-limiting aspect of the present invention quickly contemplates controlling beam forms transmitted between the base stations and the devices in order to achieve the efficiencies and operations contemplated herein.

The base stations are shown to be arranged into a wireless, celled structure where a coverage area is formed as function of wireless signaling emitted from each base station. A hexagon centered at each base station may be used to represent default signaling patterns where each section of the hexagons corresponds with a beam form having a 60° beam angle, which may be considered to be a wide beam. The illustrated wide beam may be a default or initial beam form having beamforming parameters specifically selected for the corresponding environment to prevent wireless interference with neighboring base stations, i.e., the default or wide beam may have illumination parameters (frequency, power, etc.) selected to prevent interference with neighboring based stations. The base stations may include antennas having configurable beam forms such that various beam forms may be employed depending on operating conditions and other factors, including the base stations being configured to facilitate simultaneously transmitting multiple beam forms and/or varying the default or angle of the beam forms. Rather than a 60° wide beam, a 120° wide beam angle may be used for the wide beam and smaller beam angles, such as 10° or 20°, may be used to form narrow beams, which as described below in more detail may be beneficial in facilitating the efficiencies contemplated by the present invention. A number of exemplary narrow beams are shown in phantom to emanate from the first base station 14 in order to illustrate the first base station 14 transmitting some signaling as wide beams and other signaling as narrow beams. The power levels, beam angles, delay, frequency and other beamforming parameters may be selectively adjusted to facilitate transmitting the wide beams and/or narrow beams.

The first device 16 is shown to communicate using a selected one of a plurality of narrow beams (shown in phantom also). The first device 16 may include antenna elements having capabilities similar to those employed with the first base station 14 to facilitate selectively controlling beamforming parameters in order to communicate according to desired beam forms. A first narrow beam 20 emanating from the first base station is shown to align with a second narrow beam 22 emanating from the first device 16. While the beams 20, 22 are not shown to be overlapping for illustrative purposes, the beams 20, 22 may overlap or otherwise be sufficiently interfaced to facilitate narrow beam communications between the first base station 14 and the first device 16. The second device 18 is shown to communicate using an omnidirectional beam form 24. The omnidirectional beamforming 24 may result from the second device 18 having an omnidirectional antenna lacking the capabilities associated with the antenna arrays described with respect to the base stations and the first device 16 and/or the second device 18 having a controllable antenna array where the beamforming parameters are set to facilitate the illustrated omnidirectional beam form. The first device 16 and the second device 14 may be configured to facilitate wireless signaling with a selected one or more of the base stations, such as in response to base station polling or other instructions received from one or more of the base stations. The base stations may be configured to facilitate communications with one or more of the first and second devices 16, 18 or other non-illustrated devices according to instructions received from the aggregating unit 12 and/or as a function of individually generated instructions or instructions received from other devices (not shown).

Figure 2:
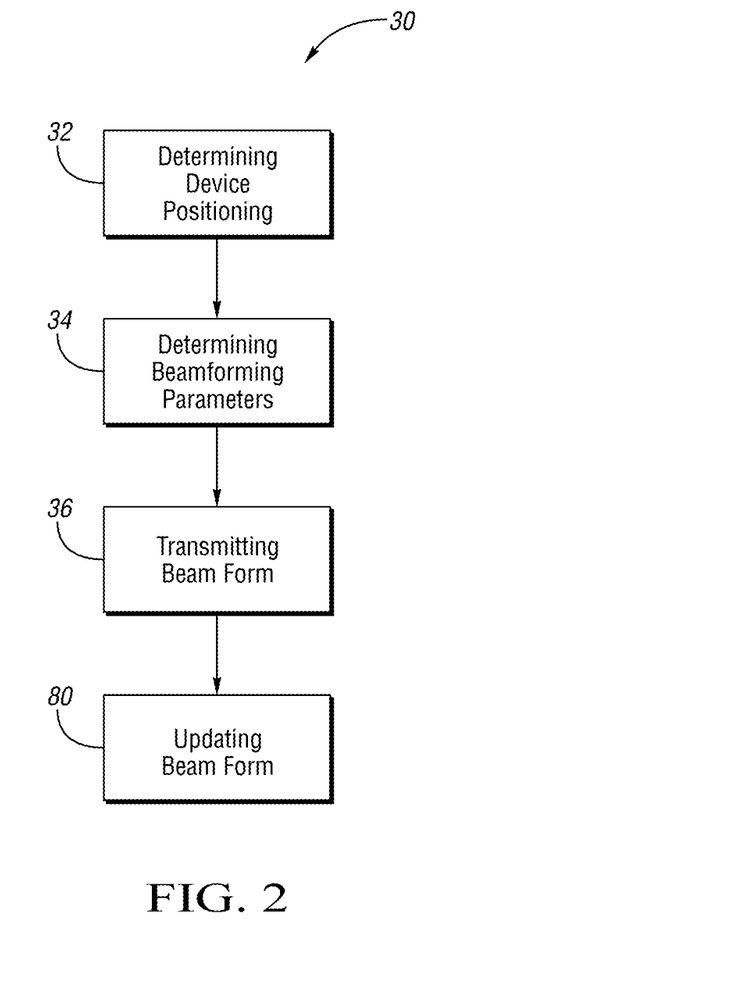
FIG. 2 illustrates a flowchart for a method of facilitating wireless signaling using beamforming in accordance with one non-limiting aspect of the present invention.

FIG. 2 illustrates a flowchart 30 for a method of facilitating wireless signaling using beamforming in accordance with one non-limiting aspect of the present invention. The method generally relates to facilitate control of the base stations or other access points to facilitate communications with the devices or other endpoints having wireless signaling capabilities. Block 32 relates to determining device positioning. The device positioning may be determined using latitude and longitude coordinates or other coordinate parameters (triangulation, GPS, etc.) to define device positioning relative to one or more of the base stations. The device positioning may be determined as a function of signaling received at one or more the base stations, such as in response to the device receiving a wide beam from one of the base stations transmitting a polling/ranging message. The base stations may be configured to periodically transmit such wide beams, such as at safe non-interfering frequencies and/or power levels, in order to periodically identify devices entering and/or exiting their particular coverage area, i.e., cell. The base stations may optionally include positioning information identifying its corresponding position in the wide beam polling or other transmitting signaling. The devices receiving such polling information may identify their relative positioning based upon the positioning information provided from the base station. The devices and/or base stations may use the positioning information to identify the closest base station or the base station to which it is moving to in order to facilitate establishing further communications therewith, e.g., communications necessary to facilitate voice, data or other content-based communications.

The signaling carrying the polling messages from the base stations to the devices may be transmitted as a wide beam in order to prevent interference with neighboring base stations and/or to facilitate conserving network resources, e.g., the wide beam may be transmitted at lower power levels or at slower bandwidths. The base stations may be configured to reuse the same spectrum for each of the wide beams associated with the hexagon sections in order to maximize spectrum re-use, which can be beneficial in ameliorating the amount of spectrum consumed when identifying the devices requiring the services so that the remaining spectrum can be utilized to facilitate voice, data or other content-based communications. The devices may respond to a corresponding one of the base stations performing a polling operation using a narrow beam directed towards the desired base station (see narrow beam 22 shown in FIG. 2). The responding device may determine the direction and/or angle of the narrow beam based on positioning information included within the polling message. These beamforming parameters may be selected in order to prevent interference with other neighboring base stations and/or to enable lower bandwidth or lower power consuming communications between the device and targeted base station. The narrow beam response 22 from the first device 16, for example, may be beneficial over the omnidirectional response 24 of the second device 18, as the narrow beam may 22 travel a greater distance than the omnidirectional beam 24 when transmitted at approximately the same power levels due to the narrow beam 22 being focused within a more constrained beam angle.

Block 34 relates to determining beamforming parameters. The beamforming parameters may correspond with control characteristics and/or variables related to controlling the antenna arrays and/or antenna elements included as part of the base stations and/or the devices to facilitate the contemplated wide beam and narrow beam beamforming. The beamforming parameters may be specified on a per device, per packet, per frame and/or per session basis in order to generate desirable beam forms on an as needed basis. The beamforming parameters may include power level, frequency (wavelength), angle, delay, direction, etc., whereby the base stations and/or the devices may selectively utilize the available beamforming parameters to achieve the desired beam forms. The base stations and/or the devices may include an application or other program to facilitate selecting the desirable beamforming parameters, which may optionally operate in cooperation with the aggregating unit 12 or another controller tasked with coordinating beamforming parameters for multiple base stations and/or devices located within a particular coverage area. One non-limiting aspect of the present invention contemplates facilitating communication using narrow beams when possible and/or when likely to achieve minimum levels of signaling required to support desired operational requirements.

The use of narrow beams may be beneficial in that the narrow beam signals may travel further than a wide beam at a comparable power level, i.e., less power may be consumed when transmitting information using a narrow beam than if the same interface were transmitted using a wide beam. The use of narrow beams may also be beneficial in maximizing spectrum re-use without the additional infrastructural costs associated with having to add additional base stations as a single base station may include capabilities sufficient to facilitate generating virtually any number of narrow beams, thereby enabling re-use of the same spectrum within each of the narrow beams. One difficulty with use of narrow beams may correspond with interferences resulting from the narrow beams traveling farther than the wide beams, at least in that the narrow beams may be more likely to interfere with a neighboring base station either due to increased power level and/or re-use of spectrum being similarly used at the neighboring base station. One non-limiting aspect of the present invention contemplates controlling beamforming parameters in a manner that ameliorates the likelihood of narrow beams interfering with neighboring base stations. The interference may be limited by controlling the beamforming parameters such that narrow beams in-line with a neighboring base station may be prevented from use altogether and/or the particular beamforming parameters or illumination patterns of the narrow beam may be adjusted to prevent interference with a neighboring base station.

A narrow beam may be considered to be in-line with another base station in the event the corresponding beam angle and/or beam direction would cross over a center of one or more neighboring base stations. The in-line determination may also be based on a distance or anticipated length of the narrow beam in that a neighboring base station may be required to be within a predefined distance of the narrow beam originating device (e.g. within two base stations) or a distance that varies according to and expected power level of the narrow beam (e.g., power required to reach another base station). One non-limiting aspect of the present invention particularly contemplates controlling the beamforming characteristics of narrow beams in order to ameliorate interference with neighboring base stations. In addition to power level controls, additional beamforming controls may include varying beam angle, e.g., a narrower narrow beam may be desirable in some circumstances in which interferences may be avoided with improved directionality and/or a wider narrow beam may be used to diminish its distance or range. Another beamforming control may include adjusting or selectively determining the frequency and/or bandwidth of the narrow beams to correspond with frequencies that are unlikely to interfere with neighboring base stations, i.e., frequencies beyond the reception range of the base stations, which may be particularly beneficial in environments where multiple or disparate types of base stations are simultaneously providing services within the same coverage area.

Figure 3:
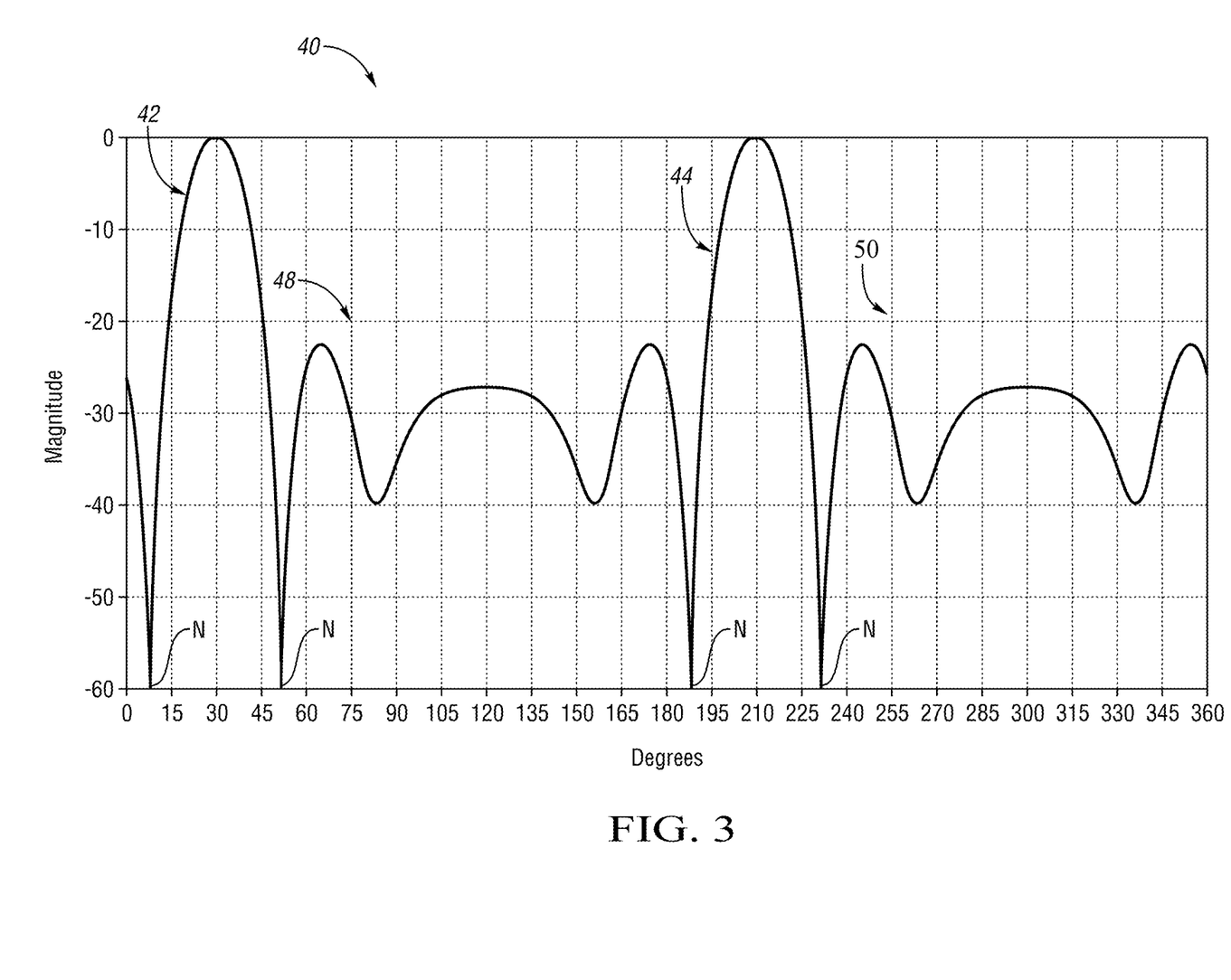
FIG. 3 illustrates a graphical model of a beam form in accordance with one non-limiting aspect of the present invention.

Block 36 relates to transmitting the selected beam form according to the determined beamforming parameters. The selected beam form may correspond with one of the above-described narrow and wide beams or some other beam shape having capabilities sufficient to facilitate the wireless signaling contemplated herein. The beam form may be transmitted for various purposes, including transmitting polling messages to identify surrounding devices, receiving response messages and/or to facilitate content exchanges between the devices and base station. One non-limiting aspect of the present invention contemplates determining the nature or context of each beam form being transmitted from the base station and/or the devices and adjusting the beam form as needed to maximize communication capabilities. FIG. 3 illustrates a graphical model of a beam form 40 in accordance with one non-limiting aspect of the present invention. The illustrated beam form 40 is shown to have a first shape 42 centered at 30° with an approximate beam angle or width of 45° for exemplary non-limiting purposes as the present invention fully contemplates any number of beam forms. The beam form 40 is shown to include a mirrored, second shape 44 at 180° offset from the first shape 42 due to the configuration of the corresponding antenna array resulting in mirrored beam forms. While the mirrored beam form 42 is shown, the present invention is not necessarily so limited and fully contemplates generating non-mirrored beam forms or a single shape for each desired beam form.

Figure 4:
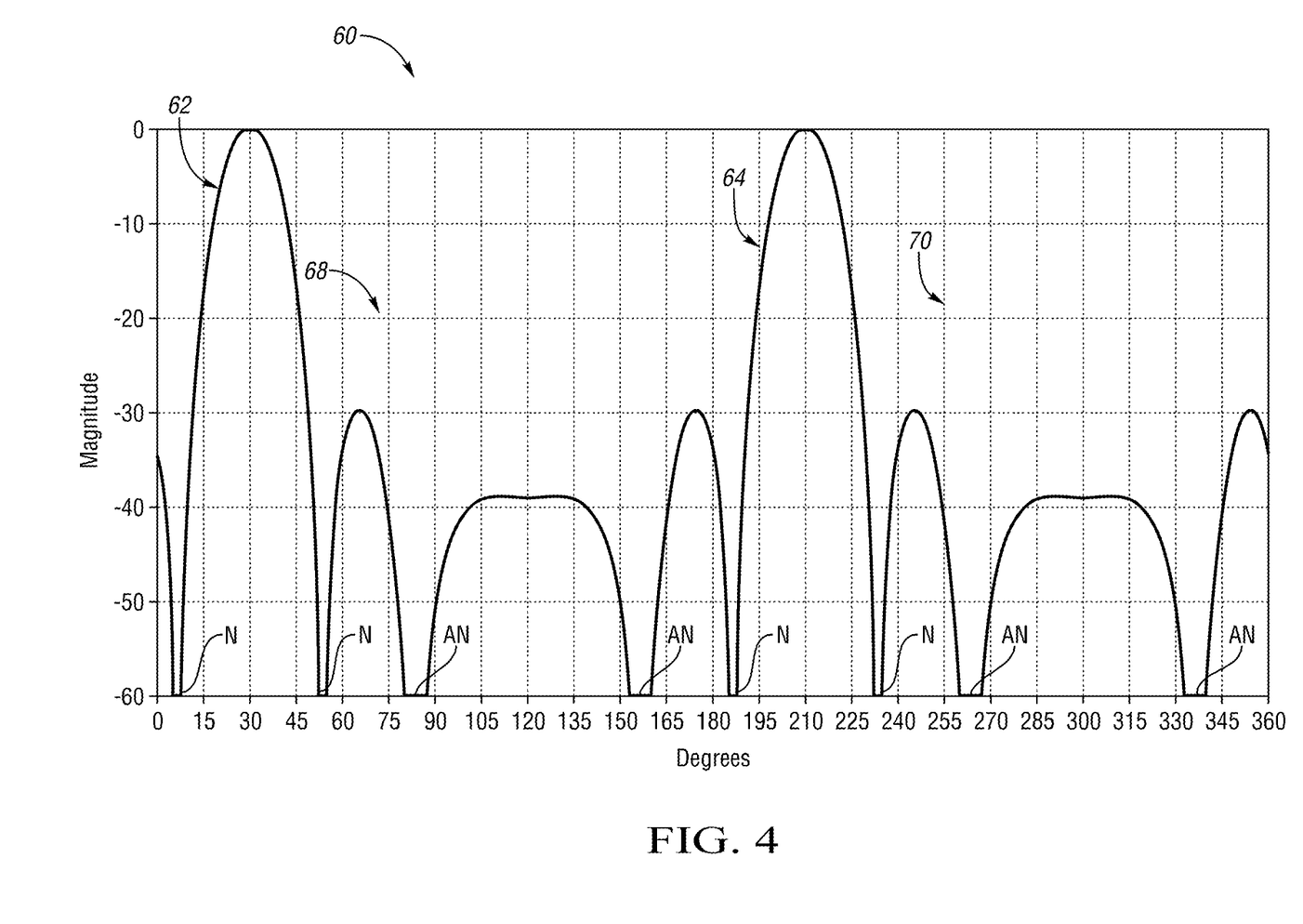
FIG. 4 illustrates a graphical model of null-adjusted beam form adjusted to provide nulls towards neighboring base stations.

The beam form 40 is shown to include nulls (N) at approximately at 7.5°, 52.5°, 187.5° and 232.5°. The nulls may be voids or areas within the transmitted wireless signaling lacking any measurable or significant power levels. Additional areas 48, 50 of extraneous noise or interference may be transmitted with the exemplary beam form 40. The power levels of these areas 48, 50 are significantly less than the peaks or centers of the first and second shapes 42, 44. While the power levels of these areas 48, 50 are significantly less, the extraneous signaling may provide interferences or otherwise disrupt signaling a reception at the neighboring base stations. One non-limiting aspect of the present invention contemplates controlling the beamforming parameters according to the particular physical implementation of the antenna array of the corresponding base station in order to facilitate directing nulls toward neighboring base stations. FIG. 4 illustrates a graphical model of null-adjusted beam 60 form adjusted to provide nulls towards neighboring base stations. The null-adjusted beam form 60 may be configured in a manner similar to the beam form shown in FIG. 3 with the exception of the areas 68, 70 providing the extraneous noise or interferences adjoin first and second shapes 62, 64 being adjusted to provide additional nulls (AN) at angles corresponding with neighboring base stations. The null-adjusted beam form 60 is shown to include additional nulls between 75° and 90°, between 150° and 165°, between 255° and 270° and between 330° and 345°.

The nulls and other beamforming parameters of the beam form desired for transmission from any one or more the base stations may be adjusted and/or originally formatted in the manner described above to facilitate wireless signaling with the nearby devices. One non-limiting aspect of the present invention contemplates continuously adjusting the beam forms in order to track device movement, to accept new devices and/or to cease communications with devices exiting the coverage area. Block 80 relates to updating one or more the transmitted beam forms according to these and other operations. The updating of the beam forms may correspond with adjusting beam angles, null positioning, frequencies, signal intensities and/or other beam transmission characteristics. The ability to update the beam forms may allow narrow beams to be continuous used while a device passes through a particular coverage area, i.e., without having to resort to wide beams, which may be beneficial in maintaining the benefits associated with the use of narrow beams. While predominately described with respect to facilitating signaling between a single base station and a single device, the present invention is not necessary limited to the base station providing a single narrow beam for each device desiring communications and fully contemplates multiple devices sharing the same narrow beam and/or providing multiple overlapping narrow beams to facilitate communication with additional devices.

Figure 5:
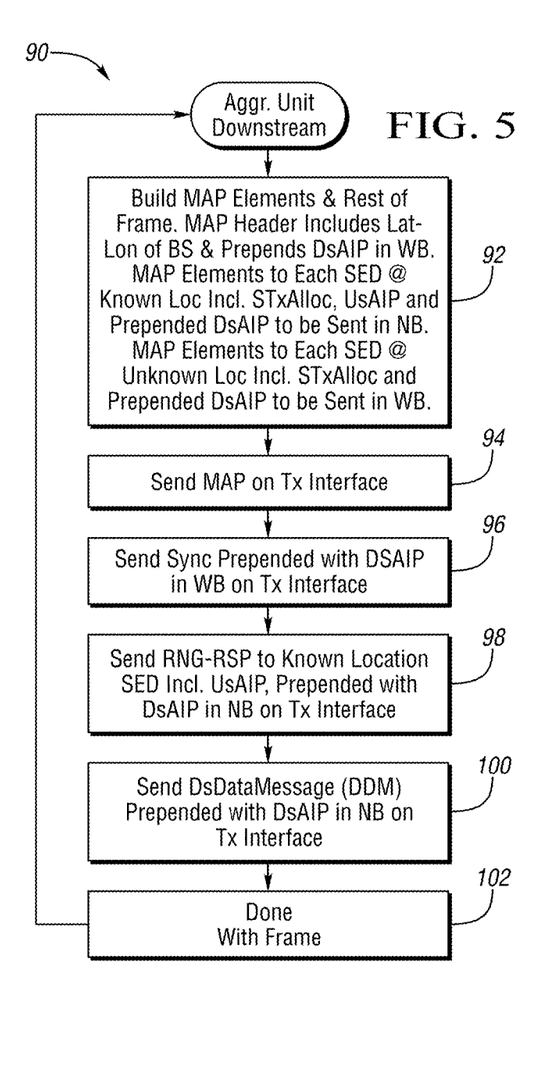
FIG. 5 illustrates a flowchart of an aggregating unit facilitating downstream communications in accordance with one non-limiting aspect of the present invention.

FIG. 5 illustrates a flowchart 90 detailing operation of the aggregating unit 12 with respect to downstream communications in accordance with one non-limiting aspect of the present invention. The downstream communications may correspond with the aggregating unit 12 scheduling data packets or specifying other information to be transmitted in a downstream direction from one or more base stations to one or more devices. Block 92 relates to the aggregating unit generating network transmission instructions, such as by building MAP elements and/or MAC frame information sufficient to facilitate data transmissions from the aggregating unit or other transmitting device a downstream direction to the base station for use in scheduling subsequent downstream communication of data to the wireless devices. The MAP elements and/or the MAC frame information may correspond with that described in U.S. patent application Ser. No. 12/954,079, entitled Method and System Operable to Facilitate Signal Transport Over a Network, the disclosure of which is hereby Incorporated by reference in its entirety. The network transmission instructions may include building a MAP header to specify latitude and longitude coordinates for the receiving base station and/or prepending downstream antenna illumination parameters (DsAIP), which may initially set wide beam (WB) parameters for the base station antenna elements.

The MAP elements may assign or prepend parameters for each device or subscriber end device (SED), including parameters for devices at a known location, i.e., devices having a determined directionality one of the base stations, subscriber transmit allocation (STxAlloc) (portions of the MAP assigned to a particular device), upstream antenna illumination parameters (UsAIP), i.e., beamforming parameters for narrow beam (NB) or wide beam, and downstream antenna illumination parameters (DsAIP), which together may be transmitted from the corresponding base station to the corresponding device using a narrow beam. For devices having unknown locations or that have not otherwise been associated with a particular base station, the MAP elements may assign the corresponding STxAlloc and DsAIP to be transmitted from the corresponding base station to the corresponding device using a wide beam. The MAP and/or MAC information may be transmitted from the aggregating unit to a corresponding one of the base stations in order to facilitate scheduling network resources used to facilitate long-haul transport between the aggregating unit or other device and the receiving base station. While the use of MAP and/or MAC information is described, the present invention is not necessary so limited and fully contemplates scheduling network resource according to other protocols and/or standards.

Block 94 relates to sending the MAP on a particular transmit interface to the desired base station. Block 96 relates to prepending synchronization (sync) information to be transmitted from the receiving base station using wide beam. The sync information may be used by the base stations and/or the devices to synchronize operations to a common clock or other temporal specification associated with the MAP. Block 98 relates to transmitting a range-response (RNG-RSP) to devices having known locations with a narrow beam, including upstream antenna illumination parameters being prepended with downstream antenna illumination parameters. The RNG-RSP may be transmitted as a narrow beam due to the known location of the devices. Block 100 relates to transmitting a downstream data message (DDM) prepended with DsAIP within a narrow beam. The DDM may include a payload for Web browsing, TV or other data requested by a device and can be transmitted as the narrow beam in order to provide efficient transport to the device. Block 102 relates to completing the messaging and other information exchanges necessary to facilitate allocating the network resources associated with a particular frame and repeating the process to facilitate scheduling network resources for additional frames. In this manner, the present invention contemplates repeatedly allocating network resources and adjusting UsAIP and DsAIP to facilitate use of wide beams and narrow beams depending on whether the location of the device(s) is known, e.g., wide beams may be used when the location is unknown and narrow beams may be used when the location is known.

Figure 6:
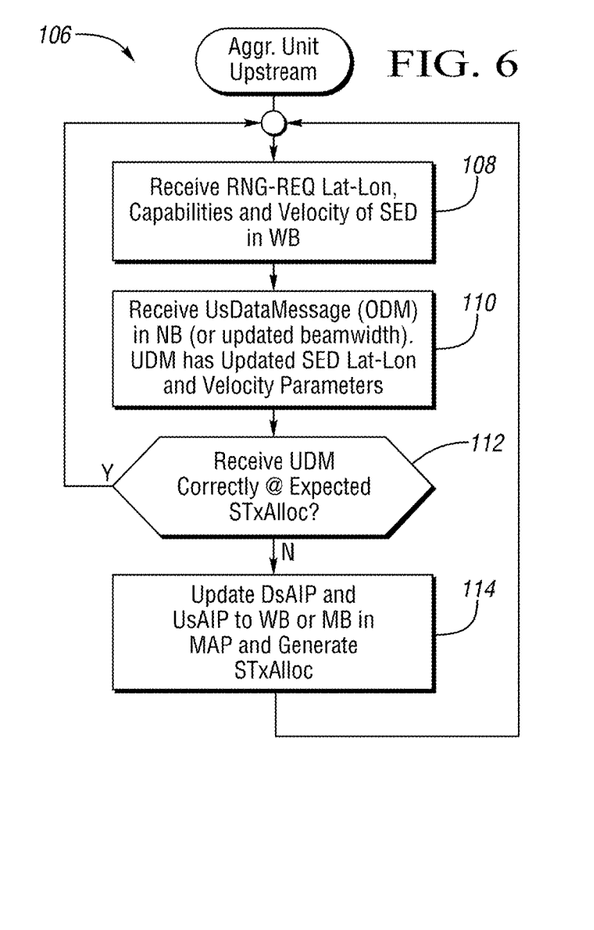
FIG. 6 illustrates a flowchart of an aggregating unit facilitating upstream communications in accordance with one non-limiting aspect of the present invention.

FIG. 6 illustrates a flowchart 106 detailing operation of the aggregating unit 12 with respect to upstream communications in accordance with one non-limiting aspect of the present invention. The upstream communications may correspond with the aggregating unit 12 receiving data or other information from the base stations and/or the devices by way of the base stations. Block 108 relates to receiving a range-request (RNG-REQ) message having latitude and longitude information regarding the transmitting device, which may include information related to the capabilities of the transmitting device to support wide beams and narrow beams and/or a velocity of the device. This information may be transmitted from the device in wide beam as the RNG-REQ message may be considered as a request for upstream transmission, i.e., the device has not been previously scheduled to consume upstream network resources. The use of wide beam may be necessary in this scenario as the location of the device may not have been previously determined. Block 110 relates to receiving and upstream data message (UDM) in a narrow beam from one of the device transmitting the RNG-REQ. The RNG-REQ may identify the positioning of the transmitting device and subsequent exchanges (see other flowchart) may be used to establish the relative positioning of the device to a corresponding one of the base stations such that the use of narrow beam may now be possible to facilitate transport of the UDM. Positioning parameters and other information may be included with the UDM to facilitate tracking movement of the transmitting device and to facilitate subsequent adjustments to the DsAIP and/or UsAIP for that device, e.g., to facilitate continued use of narrow beams.

Block 112 relates to the aggregating unit 12 assessing whether the UDM was received as expected, i.e., whether that UDM was received within the parameters defined in the corresponding STxAlloc. If the UDM was received as expected, the aggregating unit 12 may continue to monitor for additional narrow beam data transmissions and/or wide beam requests for transmission scheduling. If the UDM was not received as expected, Block 114 relates to updating the DsAIP and/or UsAIP to cease further narrow beam communications in favor of wide beam or medium beam (MB) communications. The medium beam may include a larger beam angle than the narrow beam and less than the wide beam and/or other with the medium beam having other varied beamforming parameters, e.g., a different frequency. The wide beam and/or medium beam may be beneficial controlling the transmitting device to transmit the next UDM using a beam that is more likely to be received by the desired base station, e.g., an error may result from the narrow beam being directed away from the desired base station such that use of the wide beam and/or medium beam may be used to ensure the beam is directed towards the base station.

Figure 7:
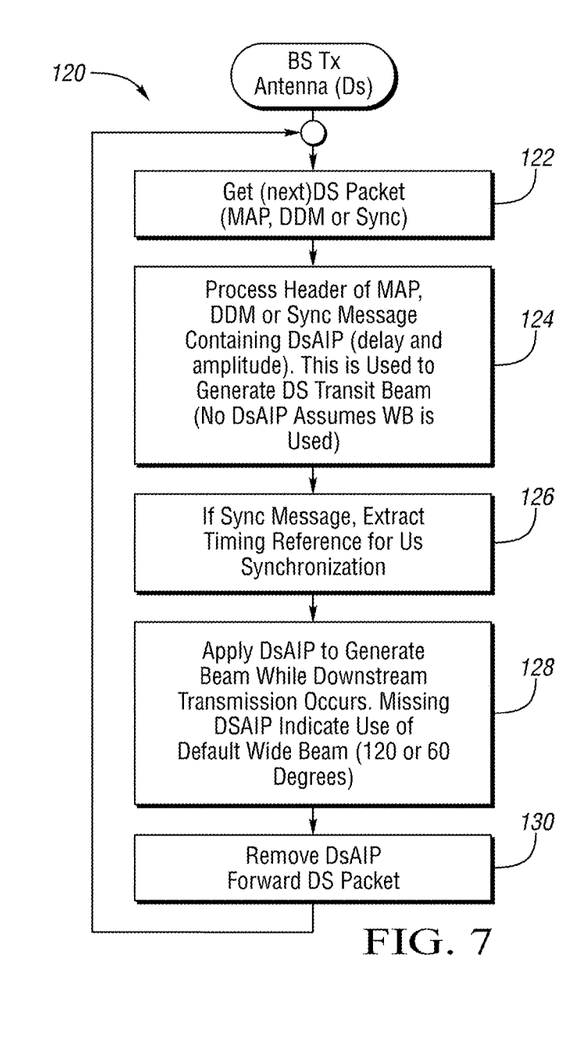
FIG. 7 illustrates a flowchart of a base station facilitating downstream communications in accordance with one non-limiting aspect of the present invention.

FIG. 7 illustrates a flowchart 120 detailing operation of a base station with respect to downstream communications in accordance with one non-limiting aspect of the present invention. The downstream communications may correspond with a base station providing a downstream (DS) packet to the desired one of the devices according to network resources allocated by the aggregating unit 12. Block 122 relates to the base station obtaining a next DS packet and facilitating its transport to the device according to the MAP information and/or information specified within the DDM or sync message. Block 124 relates to the base station processing the MAP information and/or information specified within the DDM or sync message containing the appropriate DsAIP to facilitate a beam sufficient for transmitting the DS packet to the device, which may be a narrow beam or wide beam depending on the particular DsAIP. Optionally, wide beam may be used as a default due to its enhanced reliability in the event DsAIP are unavailable. Block 126 relates to the base station processing the sync message in order to facilitate timing delivery of the DS packet. Block 128 relates to the base station processing the DsAIP, if available, to facilitate generating the appropriate beam form. Block 130 relates to the base station removing the DsAIP currently being used following transmission of the DS packets, and thereafter, repeating the process for transmitting new DS packets according to new DsAIP, i.e., wide beams and/or narrow beams.

Figure 8:
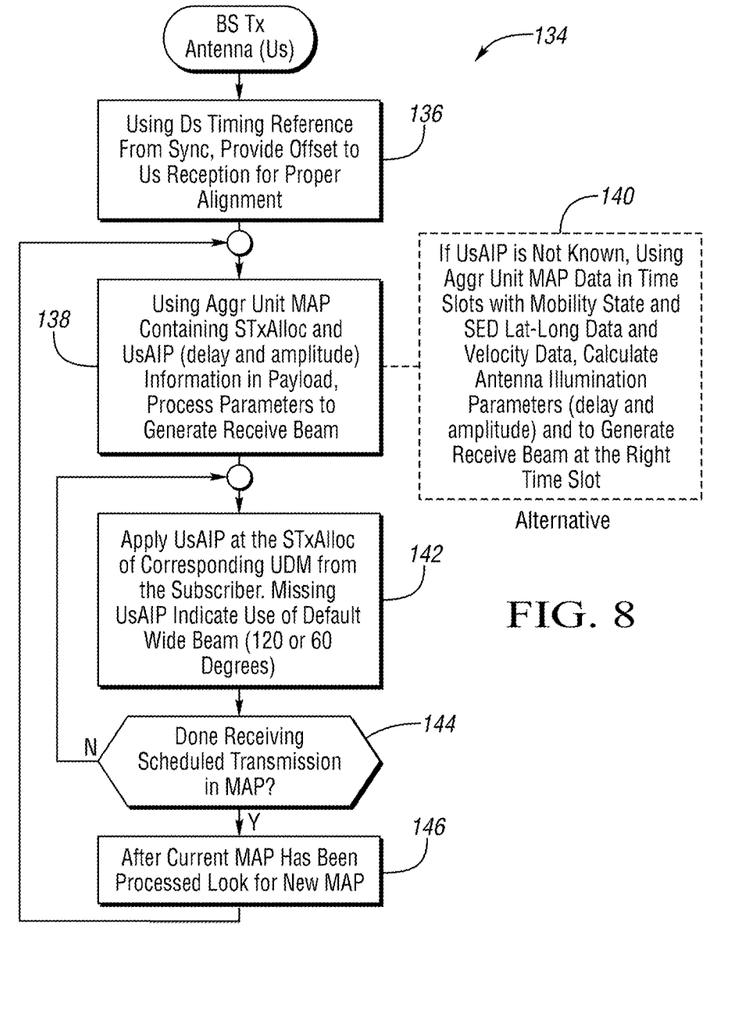
FIG. 8 illustrates a flowchart of a base station facilitating upstream communications in accordance with one non-limiting aspect of the present invention.

FIG. 8 illustrates a flowchart 134 detailing operation of a base station with respect to upstream communications in accordance with one non-limiting aspect of the present invention. The upstream communications may correspond with a base station facilitating upstream transmission of a data packet from one of the devices for long-haul transport. Block 136 relates to the base station utilizing the DS timing information for facilitate timing receipt of the upstream (US) data packet. Block 138 relates to the base station forming the UsAIP defined in the MAP, if known, or using location and velocity information (Block 140) if the UsAIP is unknown, to facilitate determining the appropriate beam form. The alternative determination of the beam form (Block 140) may be used to provide a wide beam when the device is traveling faster than a speed threshold (portability mode) and a narrow beam when the device is traveling slower than the speed threshold (mobility mode). Block 142 relates to generating the desired beam form to facilitate receipt of the upstream data message (UDM), which may be a narrow beam or a wide beam depending on the determination of the foregoing, and defaulted to a wide beam it the absence of sufficient UsAIP. Blocks 144, 146 relate to continuing the current beam form until the upstream transmission is completed, and thereafter, reassessing the desired beam form for continued upstream communications.

Figure 9:
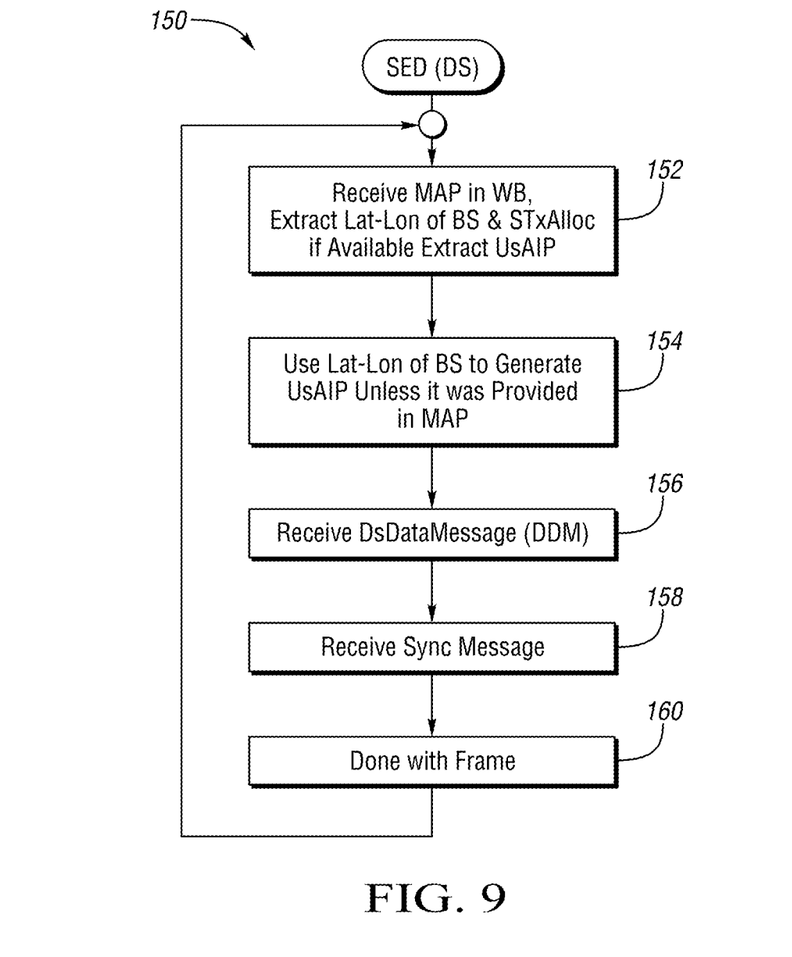
FIG. 9 illustrates a flowchart of a device facilitating downstream communications in accordance with one non-limiting aspect of the present invention.
Figure 10:
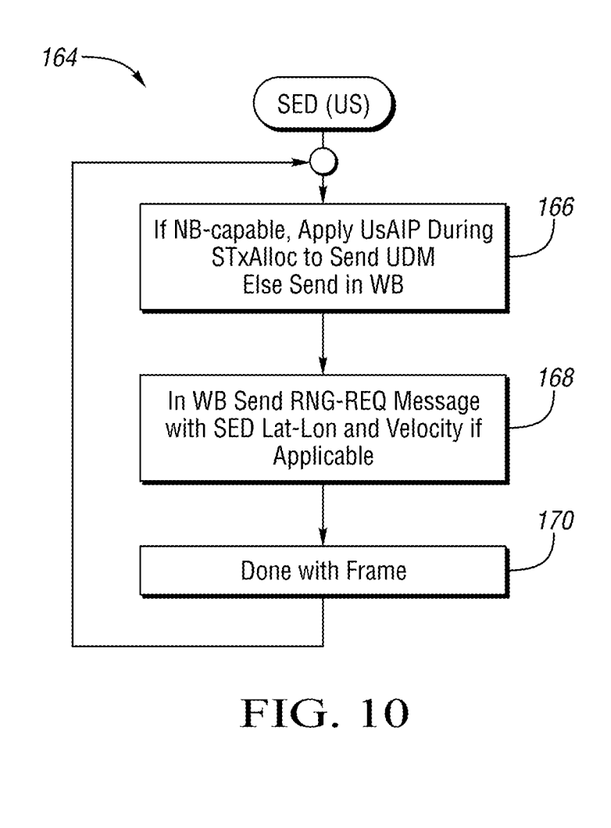
FIG. 10 illustrates a flowchart of a device facilitating upstream communications in accordance with one non-limiting aspect of the present invention.

FIG. 9 illustrates a flowchart 150 detailing operation of a device with respect to downstream communications in accordance with one non-limiting aspect of the present invention. Block 152 relates to one of the devices extracting positional information (Lat-Lon) of the base station transmitting a corresponding wide beam and any available UsAIP from the included MAP information. Block 154 relates to the device alternative generating the UsAIP based on its location to the previously extracted positioning information, i.e., generating narrow beam parameters for communicating with the bases station based on position and speed if such narrow beam parameters were not specified in the extracted UsAIP. Blocks 156, 158, 160 relate to the device receiving a corresponding DDM, synchronizing for future DDM and repeating as necessary to receive future DDM. FIG. 10 illustrates a flowchart 164 detailing operation of a device with respect to upstream communications in accordance with one non-limiting aspect of the present invention. Block 166 relates to transmitting the UDM with a narrow beam if possible, i.e., if the direction to the base station is known and/or if the device velocity is appropriate, else defaulting to a wide beam. Block 168 relates to the device requesting scheduling for future UDMs if scheduling has not already been provided, optionally using a narrow beam if possible. Block 170 relates to completing transmission of the UDM or the request for transmission of a future UDM.

As supported above, one non-limiting aspect of the present invention relates to a wireless network system incorporating beam-forming parameters for each transmission within their communication protocol based on capabilities of base station and end devices, type of transmission, velocity and distance leveraging higher antenna gains to achieve higher transport efficiencies. The contemplated beamforming may be used to improve the peak rate performance of wireless and cellular network users. It may allow wireless network operators to provide higher peak rates to their customers, and thereby, enable additional and more demanding applications and services. Operators can also leverage the higher efficiencies to expand the reach of the base stations and distribute the load to neighboring base stations that may have a lighter load. Use of narrower beams may also allow better use of spectrum resources due to capability of narrower beams to avoid frequency overlap. Proposed system could be integrated with wireline backhaul systems like CableTV or FiOS networks. The potential commercial value may include: additional revenue due to the new services enabled; additional revenue due to the capability of servicing more customers in an existing area or sector; reduced pressure for buying new spectrum; and improved customer experience (due to improved performance) that reduces churn and loss of subscribers. The present invention may be employed with virtually any wireless network provider, cellular providers, WiFi hot spots providers, broadband and/or wireline providers interested in adding wireless capabilities to their networks. Broadband service providers can use this approach to implement a broadband infrastructure without the expensive last mile build-outs and for mobile and fixed subscribers.

One non-limiting aspect of the present invention contemplates an approach that may leverage the use of agile beams using multi-element antenna arrays, e.g., use of a base station antenna having the flexibility to dynamically change its beamwidth as well as the direction at which the beam is pointing. An exchange of messages between the base station and the subscriber device may be utilized to facilitate establishing the desired beam forms and other parameters associated with facilitating wireless and/or wireline signaling. In these messages, information necessary to modify the beam direction and width may be included. A recipient or subscriber device could be portable and even mobile, such as but not limited to a subscriber device having an antenna with an omni-directional radiation pattern. The base station or access point antenna may be stationary with the capability of changing its beam width. Depending on the construction of the base stations, the system adjust its beam pointing parameters fast enough to follow a fast moving subscriber device and/or the agile beam-forming approach may be limited to slower moving subscriber devices that are deemed to be in a portable state, e.g., a subscriber device in a mobile state may be omitted from participating in the agile beam-forming. A methodology for discrimination between portability and mobility modes may be performed according to the processes described in U.S. patent application Ser. No. 13/173,314, the disclosure of which is hereby incorporated by reference in its entirety.

The agile beamforming may include various processes, including an initial ranging and registration period where the subscriber device in portability mode and the base station antenna operate in a wide beam width mode using 60 or 120 degree sectors. In this registration period the location of the subscriber devices may be estimated by any of multiple means so that with the location information the narrow beam direction can be calculated. One subscriber device location approach could leverage position information from a GPS device that is communicated through the ranging and registration messaging between base station and the subscriber device. A second subscriber device location approach can be implemented using triangulation mechanisms using at least three base stations and estimating distance based on the receive power level from the different base station antennae. A third subscriber device location approach can be implemented using triangulation mechanisms using at least three base stations and estimating distance based on the comparison of "chirp" like messages that are transmitted in a coordinated and synchronized fashion from the base stations.

A based station antenna that is suitable for this proposed functionality may be a multiple element antenna array that is capable of having independent controllable illumination of the antenna elements. In the case of a 120 degrees beamwidth, a fewer number of contiguous antenna elements (such as 3) separated by a quarter wavelength can be used where the delay to each antenna element may be the same. In cases where a narrow beam is desired, all the antenna elements may be used with the delay for each antenna element being correspondingly manipulated such that the generated wavefront or beam form points in the direction of the location of the subscriber device. One approach to generate the beam for each MAC frame may include the messages carrying payload information being sent with information carrying the antenna element illumination information/parameters. This can be achieved by encoding information in different portions of the packet such as the MAC header or the PHY layer preamble. This approach could be suitable when significant movement by the subscriber device is expected. This approach could support subscriber end devices in mobility mode at the expense of the additional overhead resulting from adding antenna element illumination information on each packet.

A second approach to generate the beam for the packets transmitted may rely on a periodic ranging process where the location updates through ranging redirects the beam. This approach may be suitable when little movement by the subscriber device is expected. An approach that allows agile beam-forming only for subscribers in portability mode is compatible with this technique. The base station may leverage velocity information to determine whether the subscriber device is in portability or mobility mode, and predicts the switching between the two. When the subscriber is in portability mode, the base station may utilize the periodic ranging process to redirect the beam as described in the second approach. When the base station determines the subscriber is moving into mobility mode, it can either redirect the antenna beam on a frame by frame basis, or transition the subscriber on the wide-beam/larger sector transmission pattern. Once the base station or access point is determined, latitude and longitude (lat-lon) information from an access point or base station may be sent to the subscriber device. If Subscriber device is portable and has beam-forming capabilities it can use them to improve gain.

The beamforming system described above may enable gain and the capability of using efficient modulation schemes, such as but not limited to allowing for higher peak rate capabilities. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wireless system for facilitating wireless signaling from a plurality of base stations to one or more devices in proximity to at least one base station of the plurality of base stations, the wireless system configured to:
    determine a first location of a first device of the one or more devices relative to a first base station of the plurality of base stations and a second base station of the plurality of base stations;
    determine a second location of a second device of the one or more devices relative to the first base station and the second base station;
    based on the determined first location of the first device, determine whether a first beam having a narrow beam form and transmitted from the first base station to the first device will interfere with the second base station;
    based on determining that the second base station will not be interfered with by the first beam having the narrow beam form, cause the first base station to transmit the first beam with the narrow beam form to the first device; and
    based on the determined second location of the second device, cause the second base station to transmit a second beam having a wide beam form to the second device.

2. The wireless system of claim 1, wherein:
    the first beam is transmitted from the first base station as a first wireless signal;
    the second beam is transmitted from the second base station as a second wireless signal; and
    the first wireless signal and the second wireless signal are transmitted at an equivalent power level.

3. The wireless system of claim 2, further configured to cause the second base station to begin transmitting the second wireless signal with the narrow beam form after the second device moves from being in-line with the first base station to being out-of-line with the first base station.

4. The wireless system of claim 1, further configured to:
    determine a velocity of the first device relative to the first base station; and
    based on the determined velocity of the first device, cause a beam form of the first beam transmitted from the first base station to change.

5. The wireless system of claim 4, wherein:
    when the determined velocity of the first device is above a speed threshold, the wireless system is further configured to cause the first beam to be transmitted toward the first device with the narrow beam form; and
    when the determined velocity of the first device is below the speed threshold, the wireless system is further configured to cause the first beam to be transmitted toward the first device with the wide beam form.

6. The wireless system of claim 1, further comprising, based on determining that the second base station will be interfered with by the first beam having the narrow beam form, cause the first base station to transmit the first beam with the wide beam form to the first device.

7. The wireless system of claim 1, wherein the first beam and the second beam wirelessly propagate in free space after being emitted by optical elements.

8. The wireless system of claim 1, wherein:
    the first beam further includes a null-adjusted beam form; and
    the null-adjusted beam form is transmitted from the first base station to the second base station.

9. A method for managing wireless signaling in a wireless network space, the method comprising:
    determining a first location of a first device from a plurality of devices with respect to a first base station and a second base station of a plurality of base stations;
    determining a second location of a second device from the plurality of devices with respect to the first base station and the second base station;
    based on the determined first location of the first device:
        determining that a first beam with a narrow beam form and transmitted from the first base station to the first device will not interfere with the second base station; and
        causing the first base station to transmit the first beam with the narrow beam form to the first device; and based on the determined second location of the second device, selecting a second base station from the plurality of base stations and causing the second base station to transmit a second beam having a wide beam form to the second device.

10. The method of claim 9, further comprising:
determining, with respect to the first base station, whether the first device is in-line or out-of-line with the second base station;
when the first device is in-line with the second base station, causing the first base station to transmit the first beam with the wide beam form; and
when the first device is out-of-line with the second base station, causing the first base station to transmit the first beam with the narrow beam form.

11. The method of claim 9, wherein determining the first location of the first device further comprises determining a velocity of the first device, with respect to the first base station.

12. The method of claim 11, further comprising:
based on the determined velocity of the first device, determining whether the first device is in a portability mode or a mobility mode;
when the first device is in the portability mode, causing the first beam to be generated through a periodic ranging process; and
when the first device is in the mobility mode, causing the first beam to be redirected on a frame-by-frame basis.

13. The method of claim 11, further comprising, based on the determined velocity of the first device, whether to cause the first base station to transmit the first beam with the narrow beam form or the wide beam form.

14. The method of claim 13, further comprising:
causing the first base station to transmit the first beam with the narrow beam form when the determined velocity of the first device is above a speed threshold; and
causing the first base station to transmit the first beam with the wide beam form when the determined velocity of the first device is below the speed threshold.

15. The method of claim 9, further comprising determining that the second device is incapable of receiving the narrow beam form.

16. The method of claim 9, wherein the wide beam form is an omnidirectional beam form.

17. A network aggregation device having a non-transitory computer-readable medium storing instructions, the instructions being executable by a processor to manage wireless signaling in a wireless network space by:
polling a first base station to collect first information, the first information including a first location of a first device;
polling a second base station to collect second information, the second information including a first location of a second device;
determining whether the first device is in-line with the first base station and the second base station;
determining whether the second device is in-line with the first base station and the second base station;
when the first device is not in-line with the first base station and the second base station, causing the first base station to transmit a first beam with a narrow beam form to the first device; and
when the second device is in-line with the first base station and the second base station, causing the second base station to transmit a second beam with a wide beam form to the second device.

18. The network aggregation device of claim 17, wherein:
the first information further includes a velocity of the first device; and
the instructions are further executable by the processor to manage wireless signaling in the wireless network space by:
causing the first base station to transmit the first beam with the narrow beam form when the velocity is above a threshold value; and
causing the first base station to transmit the first beam with the wide beam form when the velocity is below the threshold value.

19. The network aggregation device of claim 17, wherein:
the second information further includes capabilities of antenna arrays associated with the second base station; and
the second information indicates that the antenna arrays are incapable of generating the narrow beam form.

20. The network aggregation device of claim 17, wherein the wide beam form is generated by an omnidirectional antenna associated with the second base station.

* * * * *